Nov. 12, 1968  H. G. FREEMAN  3,410,000
PRESSURE SEALING DEVICE
Filed May 16, 1966

INVENTOR,
HOWARD G. FREEMAN

United States Patent Office  3,410,000
Patented Nov. 12, 1968

3,410,000
PRESSURE SEALING DEVICE
Howard G. Freeman, Worcester, Mass., assignor to Jamesbury Corporation, Worcester, Mass., a corporation of Massachusetts
Filed May 16, 1966, Ser. No. 550,416
6 Claims. (Cl. 34—242)

ABSTRACT OF THE DISCLOSURE

A pressure sealing device through which elongated material such as sheets, strands, or yarns can be introduced into or taken out of a pressure vessel is provided. A roller covered with a flexible material having a plurality of longitudinally extending slashes, each raising an axially extending vane, is placed eccentrically in a duct communicating with the vessel. As the roller rotates, the vanes are compressed to a greater extent as they rotate past one surface of the duct than the other, thereby accommodating the passage of the elongated material while maintaining a pressure-tight seal.

---

This invention relates to a sealing device whereby elongated materials may be passed continuously into and out of processing vessels which are maintained at a higher or lower than ambient pressure or between zones of processing equipment maintained at pressures which are different from each other. This invention also relates to an improved roller for use with such sealing devices and to the method of making such improved rollers.

Such sealing devices are essential for the continuous treatment at elevated or reduced pressures of elongated materials such as textiles, woven and non-woven fabrics, fibers, filaments, yarns, singly or in multiple fashion, paper, film, belting, ribbons, pulp, and the like. However, it should be noted that even where such elongated material is to be treated in non-continuous (batch-wise) fashion, it can be moved into and out of vessels by means of such pressure sealing devices without dissipating a pressure differential which may exist around the device, e.g., between the vessels sealed by such a device and its surroundings.

A pressure sealing device employing a pair of counter-rotating rollers has been proposed in U.S. Patent 3,083,556 to Leonard. Each of the rollers has a plurality of slots machined into its surface which permit the attachment thereto of flexible vanes by means of counter-sunk screws. As the rollers rotate, the flexible vanes protruding from the surface of the rollers are forced into contact with a conduit communicating with the port of the vessel, thereby serving to seal that port.

It is an object of this invention to provide an improved sealing roller with flexible vanes protruding from its surface. It is another object of this invention to provide an improved pressure sealing device employing a roller of the type described. It is still another object of this invention to provide a method for making rollers of the type described more simply and cheaply, with fewer and easier operational steps. The manner in which these and other objects and advantages are accomplished by this invention will become apparent from the description thereof in this specification and taken in connection with the accompanying drawings in which:

The roller of the instant invention comprises a roller core 1 surrounded by a sleeve 2 of a stiffly flexible material in the general form of a cylindrical cover. This sleeve should have a slightly smaller relaxed internal diameter than the external diameter of the roller core so that the sleeve must be stretched to be fitted over the roller core. This stretching serves the dual function of preventing the sleeve from slipping off the core and of providing the internal stresses in the sleeve required to cause the protrusion of the vanes to be described below.

The roller core may be made of any convenient material which will lend to the roller the requisite rigidity. A good grade of tool steel is highly suitable for this purpose. The roller core will be generally cylindrical in shape and may have fittings 6 for mounting and/or rotational driving means on its axial extremities.

The cover material must be sufficiently flexible to permit it to deform as it is pressed against the rigid wall of the port and thereby create a seal. It must, however, be sufficiently stiff so that after it is stretched around the roller core, the stresses induced in the material by the stretching operation will cause the vanes formed in the slashing operation to be described below to have a tendency to protrude from the roller surface. Suitable materials for this purpose are polyethylene, nylon, Teflon, rubber and the like. A neoprene compound with a Shore A Durometer between 35 and 70, or a Hypalon or silicone rubber of similar properties, would be highly suitable.

Figure 1:
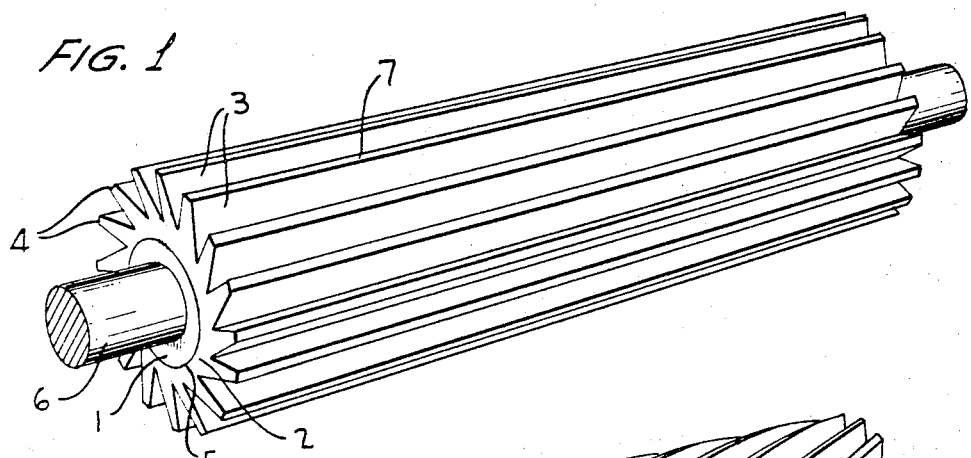
FIGURE 1 is an isometric representation of an embodiment of a roller of the instant invention.
Figure 2:
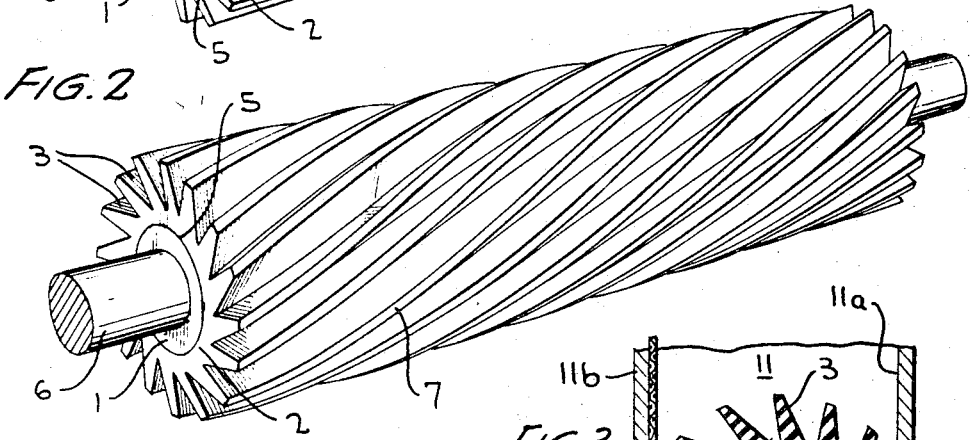
FIGURE 2 is an isometric representation of another embodiment of a roller of the instant invention.

A series of slashes 3 is then made in the roller cover so mounted on the core to produce the roller of the instant invention. Each slash is made by passing a planar cutting surface, which is oriented to describe a secant to the said roller, in a direction which is essentially axial to the said roller. The cutting surface may travel truly axially of the said roller, thereby raising a series of linear vanes 7 as shown in FIGURE 1, or may be passed in such fashion as to describe for each pass to low pitch helix which is coaxial with the cylinder defined by the said roller cover thereby raising a series of helical vanes 7 as shown in FIGURE 2.

Each of the slashes thus formed will extend inwardly from the outside surface 4 of the roller cover toward the inside surface 5 of the roller cover without quite reaching the latter so as not to destroy the integrity of the cover. Each of these slashes will be at a relatively low angle with a tangent to the roller at the point of slashing, as for instance an angle of between fifteen and thirty degrees. A plurality of these slashes will be distributed around the circumference of the roller, preferably, though not necessarily, in uniformly spaced fashion.

Due to the stiffness of the cover material, and due to the tension created in it by stretching it over the roller core, each of the slashes will raise a vane 7 from the surface of the roller. These vanes, when the roller is used in a pressure sealing device of the type described, serve to effect a pressure-tight seal with the other member of the sealing device with which it coacts. That other member may be a stationary member or a second rotating roller. The pressure being sealed by the device acts against the slashed surface to force the vane into tighter frictional contact with the member with which the roller coacts. That other member may be a stationary member or a second rotating roller. The pressure being sealed by the device acts against the slashed surface to force the vane into tighter frictional contact with the member with which the roller coacts to effect the seal. The vanes must be located at sufficiently frequent intervals along the circumference of the roller so that at least one such vane is always in contact with the other sealing member.

Figure 3:
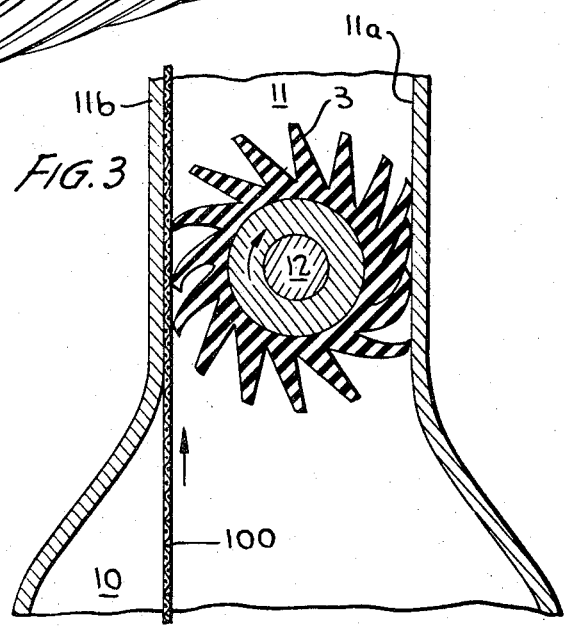
FIGURE 3 is a cross sectional representation of a port of egress of a pressure vessel fitted with a sealing device of the instant invention.

FIGURE 3 illustrates a sealing device of this invention. A pressure vessel 10 fitted with a pressure-tight conduit 5 communicating with an egress port 11. (This conduit may be attached to the vessel or formed integrally with it.) The port and conduit have a general configuration suitable to permit the unhampered passage therethrough of the elongated material to be removed therefrom. Thus, if the elongated material is a fabric of a given width, the conduit 11 will have a width at least somewhat greater than the width of the fabric. The depth of the conduit will be somewhat less than the diameter of the roller 12 which will cooperate therewith.

The roller 12 is a roller with a vaned surface of the type described above, either such as that depicted in FIGURE 1, or that depicted in FIGURE 2, or any other such roller. The roller is rotatably mounted within the pressure-tight conduit communicating with the egress port. The ends of the roller are fitted with conventional means (not shown) suited to prevent the escape of pressure around the rotatable mounting.

It will be noted from FIGURE 3 that the roller 12 is not mounted centrally within the conduit 11 but rather in such fashion that the vanes 7 of the roller are very tightly compressed against one wall 11a of the conduit and less tightly compressed but nevertheless flexed as they pass the other wall 11b thereof. The fabric 100 being removed through the egress port passes along the latter wall of the conduit.

There is no escape of pressure between wall 11a of the conduit and the roller because the roller is positioned so closely to it that the vanes are thoroughly compressed as they brush against the wall during rotation. If desired, a stream of lubricating fluid such as water can be directed against the portion of the roller about to undergo this contact. Nor does pressure leak between the roller and wall 11b of the conduit because of the conformation of the vaned roller. The pressure in the vessel acts upon that surface of each vane closest to the vessel to force the vane against the other member of the seal. Thus, the higher the pressure, the tighter the seal.

Figure 4:
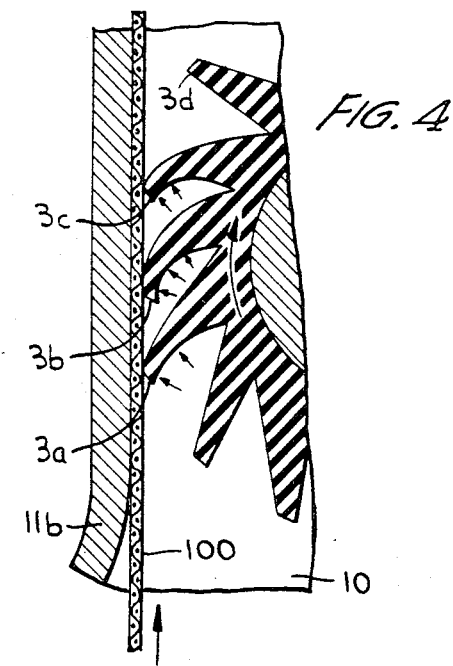
FIGURE 4 is an enlarged view of a portion of that sealing device indicating how the pressure differential between the vessel and its surroundings help to maintain the seal.

As can best be seen in FIGURE 4, vane 3a is just coming into contact with the fabric 100 which is sliding along wall 11b as it passes out of the vessel 10. Vane 3b is more tightly in contact with the fabric, the contact being sufficiently tight to flex or distend vane 3b but not to the same extent as the vanes on the opposite side of the roller are flexed or distended. Pressure from the pressure vessel acts against the underside of these vanes to force them against the fabric and thereby to maintain the pressure-tight seal. This pressure continues to operate on any given vane to maintain the seal until that vane has passed out of contact with the fabric. Thus, in FIGURE 4, vane 3c is still being forced against the fabric by the pressure obtaining within the vessel. Vane 3d, out of contact with the fabric, has released the pressure entrapped between it and vane 3c. The motive power for the rotation of roller 12 can be provided by any conventional drive means such as a motor coupled to one axle of the roller through gears, chains, or belts.

As will be readily apparent to one skilled in this art, the sealing device configuration shown in FIGURE 3 could readily be reversed to provide a sealing device for an access rather than an egress port.

I claim:
1. A pressure sealing device to permit the movement of elongated material through an opening in a vessel wherein the pressure is maintained at a substantial increment relative to that outside said vessel comprising an axially rotatable roller with a plurality of radially protruding and generally axially extending stiffly flexible vanes distributed in generally uniform fashion on its surface, said roller mounted eccentrically between generally parallel surfaces of a pressure tight conduit communicating with said opening, closer to the second of said parallel surfaces than to the first of said parallel surfaces, in such fashion that each vane is flexed as it rotates past the first of said parallel surfaces and is thoroughly compressed against the roller surface as it rotates past the second of said parallel surfaces.

2. The pressure sealing device of claim 1 wherein said roller comprises a roller core; and a sleeve of stiff, flexible material surrounding said roller core to form thereon a cover of generally cylindrical shape, said cover containing a plurality of parallel slashes extending inwardly from the outer surface thereof part way to the inner surface thereof, each of said slashes being the locus of a segment of a secant of said cylinder translated substantially axially thereof, whereby each of said slashes raises from said cover in a generally radial direction an axially extending vane.

3. The pressure sealing device of claim 2 wherein each of said slashes defines a low-pitch helix coaxial with said roller.

4. The pressure sealing device of claim 2 wherein each of said slashes is axially aligned with said roller.

5. The pressure sealing device of claim 2 wherein said sleeve has a relaxed internal diameter smaller than the external diameter of said roller core.

6. The pressure sealing device of claim 2 wherein said vanes are distributed relatively uniformly about the circumference of said roller.

References Cited
UNITED STATES PATENTS

| | | | |
|---|---|---|---|
| 1,793,202 | 2/1931 | Wolstenholme | 29—121 |
| 2,364,983 | 12/1944 | Lagasse. | |
| 2,729,027 | 1/1956 | Slayter et al. | 29—121 XR |
| 3,083,556 | 4/1963 | Leonard | 34—242 XR |
| 3,090,134 | 5/1963 | Morrison | 34—242 |

FREDERICK L. MATTESON, JR., *Primary Examiner.*

H. B. RAMEY, *Assistant Examiner.*